United States Patent
Fujita et al.

(10) Patent No.: US 11,227,450 B2
(45) Date of Patent: *Jan. 18, 2022

(54) ROADSIDE RADIO DEVICE AND RADIO COMMUNICATION SYSTEM

(71) Applicant: RENESAS ELECTRONICS CORPORATION, Tokyo (JP)

(72) Inventors: Suguru Fujita, Tokyo (JP); Nobuharu Yoshioka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,528

(22) Filed: Oct. 1, 2020

(65) Prior Publication Data

US 2021/0134074 A1    May 6, 2021

(30) Foreign Application Priority Data

Nov. 5, 2019  (JP) .............................. JP2019-200649

(51) Int. Cl.
| | |
|---|---|
| *G07B 15/06* | (2011.01) |
| *H04W 4/44* | (2018.01) |
| *G08G 1/017* | (2006.01) |
| *G08G 1/0967* | (2006.01) |

(52) U.S. Cl.
CPC .......... *G07B 15/063* (2013.01); *G08G 1/017* (2013.01); *G08G 1/096783* (2013.01); *H04W 4/44* (2018.02)

(58) Field of Classification Search
CPC ................. G07B 15/063; G08G 1/017; G08G 1/096783; H04W 4/44

See application file for complete search history.

(56) References Cited

U.S. PATENT DOCUMENTS 10,111,264 B2    10/2018  Oshida
10,869,276 B1 *  12/2020  Lekutai ............ H04W 52/0261
(Continued)

FOREIGN PATENT DOCUMENTS

JP    2017-028654 A    2/2017

OTHER PUBLICATIONS

Extended European Search Report issued in corresponding European Patent Application No. 20205375.7-1218, dated Mar. 19, 2021.

*Primary Examiner* — Mohamed Barakat
(74) *Attorney, Agent, or Firm* — McDermott Will & Emery LLP

(57) ABSTRACT

A roadside radio device includes a first radio unit which receives a radio data packet from an in-vehicle radio device, and a first application unit which processes application data. The first radio unit includes a radio data processing unit including a correlation processing unit which compares a data string of vehicle identification information with a data string of communication type information to determine whether there is a correlation in the radio data packet. When the correlation processing unit determines that there is the correlation in the radio data packet, the first radio unit outputs the application data included in the radio data packet to the first application unit. When the correlation processing unit determines that there is no correlation in the radio data packet, the first radio unit treats the radio data packet as invalid data.

20 Claims, 11 Drawing Sheets

(56) References Cited

U.S. PATENT DOCUMENTS

| | | | | |
|---|---|---|---|---|
| 2009/0296680 A1* | 12/2009 | Suzuki | ............. | H04W 72/0406 |
| | | | | 370/342 |
| 2013/0033386 A1* | 2/2013 | Zlojutro | ................ | G08G 1/017 |
| | | | | 340/935 |
| 2018/0338001 A1* | 11/2018 | Pereira Cabral | ........ | H04L 12/14 |
| 2019/0147668 A1* | 5/2019 | Ravi | ................ | H04M 1/72463 |
| | | | | 701/29.6 |
| 2020/0072963 A1* | 3/2020 | Yu | ........................ | G01S 13/931 |

\* cited by examiner

ROADSIDE RADIO DEVICE AND RADIO COMMUNICATION SYSTEM

CROSS-REFERENCE TO RELATED APPLICATIONS

The disclosure of Japanese Patent Application No. 2019-200649 filed on Nov. 5, 2019 including the specification, drawings and abstract is incorporated herein by reference in its entirety.

BACKGROUND

This disclosure relates to a roadside radio device and a radio communication system.

Radio communication technology in automobiles such as vehicle-to-vehicle communication and road-to-vehicle communication is known. The need for security in these radio communication technologies has become increasingly important in the practical application of automatic operation technologies.

There are disclosed techniques listed below.
[Patent Document 1] Japanese Unexamined Patent Application Publication No. 2017-28654

For example, Patent Document 1 discloses a technique for detecting spoofing caused by replay attacks.

There is a threat that external time information is tampered with by a malicious third party modifying a Global Positioning System (GPS) module. The technique disclosed in Patent Document 1 verifies whether the external time information has been tampered with by comparing the newly acquired external time information and the internal time information before the power is turned on, after the power supply to the Vehicle to X (V2X) module is restarted.

SUMMARY

However, when the radio communication device is a spoofing radio communication device due to tampering with the application executed by the application unit of the radio communication device, the spoofing radio communication device cannot be detected by the technique disclosed in Patent Document 1.

Other objects and novel features will be apparent from the description of this specification and the accompanying drawings.

A roadside radio device according to one embodiment includes a first radio unit which receives a radio data packet from an in-vehicle radio device, and a first application unit which processes application data. The first radio unit includes a radio data processing unit including a correlation processing unit which compares a data string of vehicle identification information with a data string of communication type information to determine whether there is a correlation in the radio data packet. When the correlation processing unit determines that there is the correlation in the radio data packet, the first radio unit outputs the application data included in the radio data packet to the first application unit. When the correlation processing unit determines that there is no correlation in the radio data packet, the first radio unit treats the radio data packet as invalid data.

According to one embodiment, the roadside radio device can detect the spoofing radio device even when the in-vehicle radio device is the spoofing radio device due to tampering with the application part of the in-vehicle radio device.

DETAILED DESCRIPTION

Figure 1:
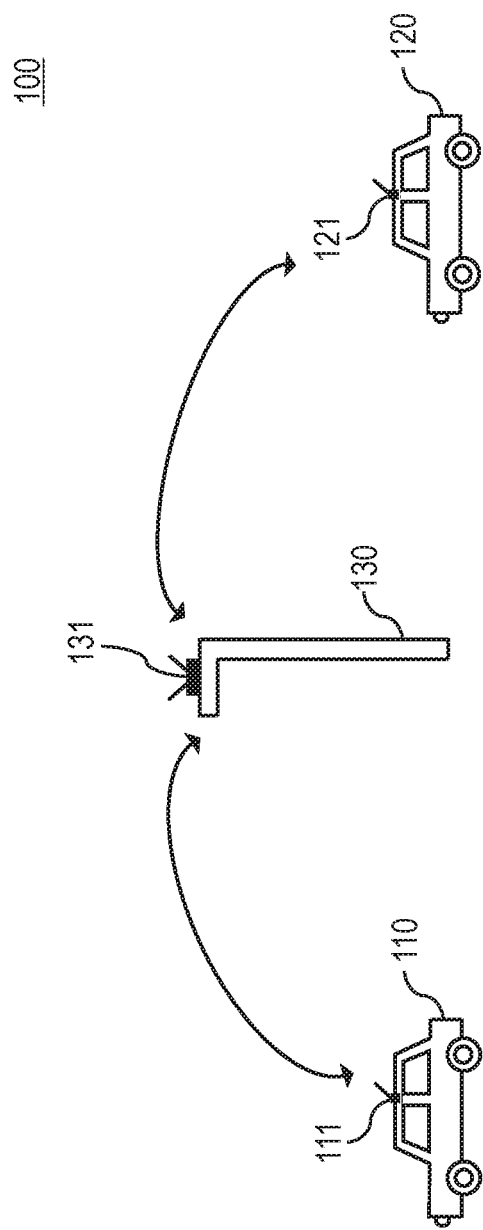
FIG. 1 is a diagram showing an example of a configuration of a radio communication system according to a first embodiment.

Hereinafter, embodiments of the present will be described in detail with reference to the drawings. In the specification and the drawings, the same or corresponding components are denoted by the same reference numerals, and a repetitive description thereof is omitted. In the drawings, for convenience of description, the configuration may be omitted or simplified.

First Embodiment

FIG. 1 is a diagram showing an example of a configuration of a radio communication system 100 according to a first embodiment. As shown in FIG. 1, the radio communication system 100 includes a radio communication device 111 mounted in a vehicle 110, a radio communication device 121 mounted in a vehicle 120, and a radio communication device 131 mounted in a roadside apparatus 130. Hereinafter, the radio communication devices 111 and 121 are referred to as in-vehicle radio devices 111 and 121. The radio communication device 131 is also referred to as a roadside radio device 131.

The vehicles 110 and 120 transmit and receive messages to and from the roadside radio device 131 mounted in the roadside apparatus 130 using the in-vehicle radio device 111 mounted in the vehicle 110 and the in-vehicle radio device 121 mounted in the vehicle 120. The messages transmitted from the vehicles 110 and 120 include vehicle information such as, for example, the speed and traveling direction of the own vehicle. The vehicles 110 and 120 may exchange vehicle information with each other via the roadside apparatus 130. In addition, a message including highly reliable surrounding information is transmitted from the roadside apparatus 130 to the vehicles 110 and 120. The vehicles 110 and 120 can appropriately perform driving control, such as maintaining inter-vehicle distance, by transmitting and receiving these messages.

The radio communication system 100 of FIG. 1, in addition to the in-vehicle radio devices 111 and 121, includes many in-vehicle radio devices mounted in vehicles (not shown). In addition, the in-vehicle radio devices included in the radio communication system 100 execute various applications and transmit and receive many messages. In this way, in the radio communication system 100 in which many messages are transmitted and received, securing sufficient communication resources is important in realizing stable communication.

However, for example, when the in-vehicle radio device 121 is a spoofing radio device, communication resources are wastefully consumed by messages transmitted from the spoofing radio device. That is, if the communication resource is not sufficiently secured, a normal radio communication device, for example, the in-vehicle radio device 111 or the roadside radio device 131 may not be able to properly transmit the message. To avoid this situation, it is necessary to properly detect the spoofing radio device and to exclude the detected spoofing radio device from the radio communication system 100. Hereinafter, a mechanism for detecting and excluding the spoofing radio device will be described.

Figure 2:
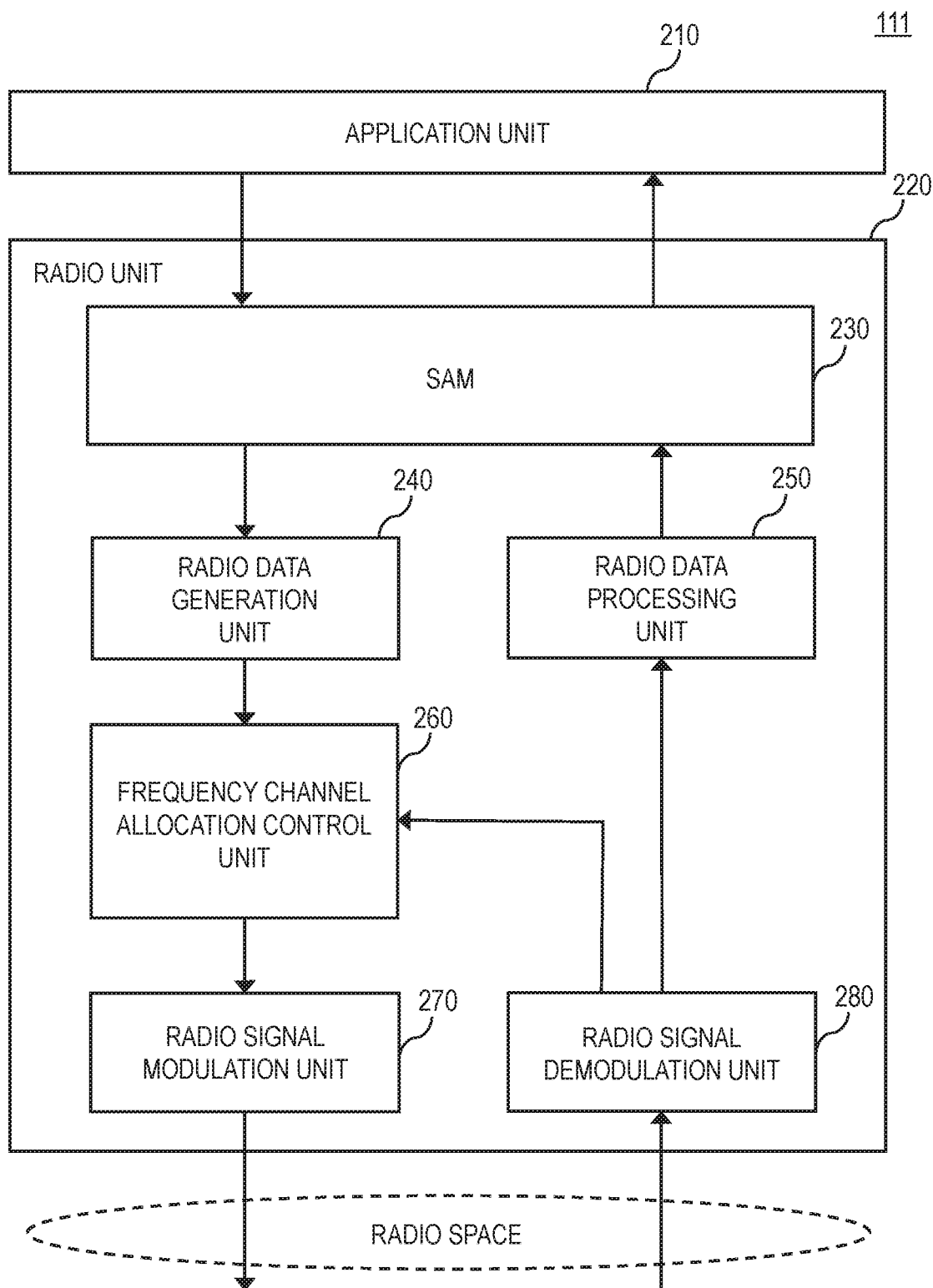
FIG. 2 is a block diagram showing an example of a configuration of an in-vehicle radio device according to the first embodiment.

Next, the in-vehicle radio device according to the first embodiment will be described. FIG. 2 is a block diagram showing an example of a configuration of the in-vehicle radio device 111 according to the first embodiment. Since the in-vehicle radio devices 111 and 121 have the same configuration, only the configuration of the in-vehicle radio device 111 is described here. As shown in FIG. 2, the in-vehicle radio device 111 includes an application unit (second application unit) 210 and a radio unit (second radio unit) 220. The application unit 210 and the radio unit 220 are connected to each other.

When the in-vehicle radio device 111 starts data transmission processing to the roadside radio device 131, the application unit 210 generates an application data packet. The application unit 210 outputs the application data packet to the radio unit 220.

The application data packet includes an application header, communication type information, and application data. The application header is information indicating the head of the application data packet. The communication type information is information indicating a vehicle to which the application data relates. The application data is data processed by the application.

The communication type information is indicated by vehicle class information. The vehicle class information is information that identifies whether a vehicle is a general vehicle or a special vehicle. The special vehicles include emergency vehicles and passenger vehicles. For example, an ambulance vehicle, a firefighting vehicle, a police vehicle, or the like is exemplified as the emergency vehicle. A bus, a taxi, a rail vehicle, or the like is exemplified as the passenger vehicle. The special vehicle may distinguish between the emergency vehicle and the passenger vehicle.

In addition, when the in-vehicle radio device 111 performs the reception processing of the data from the roadside radio device 131, the application unit 210 receives a demodulated application data packet from the radio unit 220. The application unit 210 processes the application data included in the received application data packet.

The radio unit 220 includes a Secure Application Module (SAM) 230, a radio data generation unit 240, a radio data processing unit 250, a frequency channel allocation control unit (second frequency channel allocation control unit) 260, a radio signal modulation unit 270, and a radio signal demodulation unit 280.

The SAM 230 is connected to the application unit 210. When performing the transmission processing, the SAM 230 receives the application data packet from the application unit 210. The SAM 230 generates a SAM data packet by appending a SAM header and application related information to the application data packet. The SAM 230 is connected to the radio data generation unit 240, and outputs the generated SAM data packet to the radio data generation unit 240.

The SAM header is information indicating the head of the SAM data packet. The application related information includes vehicle identification information and reserved area data. The vehicle identification information is information indicating the vehicle in which the in-vehicle radio device 111 is mounted. The vehicle identification information is indicated by the vehicle class information like the communication type information. That is, the vehicle class information is commonly used in the vehicle identification information and the communication type information. The reserved area data is data of the spare information area in preparation for future system expansion.

In addition, the SAM 230 is connected to the radio data processing unit 250. When performing the reception processing, the SAM 230 receives a demodulated SAM data packet from the radio data processing unit 250. The SAM 230 demodulates the application data packet from the demodulated SAM data packet. Specifically, the SAM 230 removes the SAM header and the application related information from the demodulated SAM data packet and demodulates the application data packet. At this time, the SAM 230 performs processing of including the part of the removed information in the application data. In this way, the demodulated application data packet is output from the SAM 230 of the radio unit 220 to the application unit 210.

The radio data generation unit 240 generates a radio data packet by appending a radio unit header including information for radio communication to the SAM data packet received from the SAM 230. The radio data generation unit 240 is connected to the frequency channel allocation control unit 260 and outputs the radio data packet to the frequency channel allocation control unit 260.

The radio unit header includes a preamble (PA), a frequency channel, a Media Access Control (MAC) address, and a radio type. The preamble is information for detecting the presence or absence of radio data. The frequency channel is information indicating a frequency channel used in radio communication. The MAC address is information for identifying a radio device. The radio type is information indicating whether the data to be transmitted is data related to a frequency channel request. Since the radio data packet output from the radio data generation unit 240 is not data related to the frequency channel request, the radio type indicates that the data to be transmitted is not data related to the frequency channel request.

The frequency channel allocation control unit 260 is connected to the radio signal modulation unit 270. The frequency channel allocation control unit 260 confirms whether the frequency channel for radio communication is allocated to the in-vehicle radio device 111. When confirming that the frequency channel is allocated, the frequency channel allocation control unit 260 outputs the radio data packet received from the radio data generation unit 240 to the radio signal modulation unit 270.

On the other hand, when confirming that the frequency channel for radio communication is not allocated to the in-vehicle radio device 111, the frequency channel allocation control unit 260 generates a frequency channel request signal. The frequency channel allocation control unit 260 outputs the frequency channel request signal to the radio signal modulation unit 270.

Figure 3:
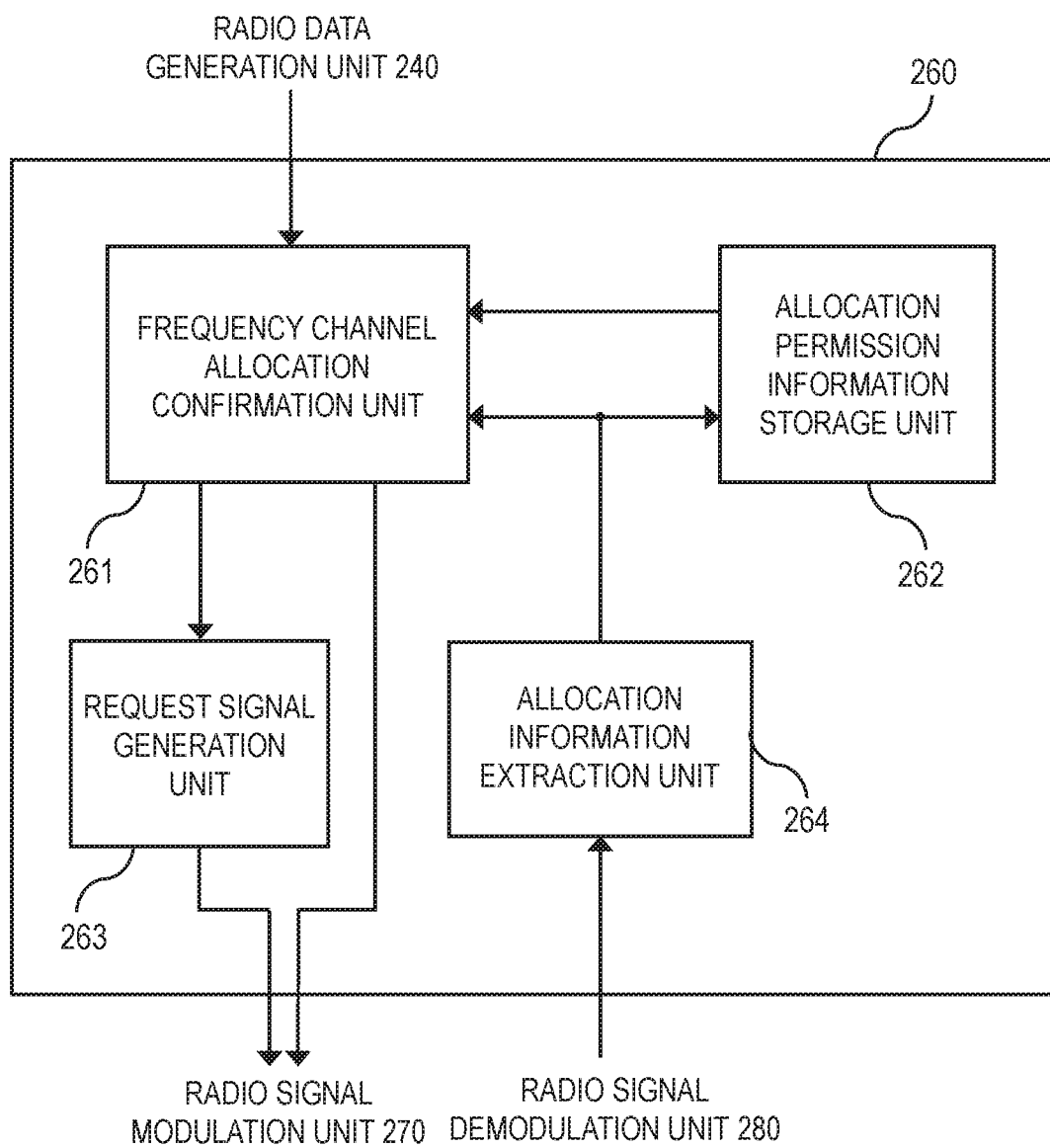
FIG. 3 is a block diagram showing an example of a configuration of a frequency channel allocation control unit according to the first embodiment.

Here, with reference to FIG. 3, a configuration of the frequency channel allocation control unit 260 will be described in detail. FIG. 3 is a block diagram showing an example of the configuration of the frequency channel allocation control unit 260 according to the first embodiment. As shown in FIG. 3, the frequency channel allocation control unit 260 includes frequency channel allocation confirmation unit 261, an allocation permission information storage unit 262, a request signal generation unit 263, and an allocation information extraction unit 264.

The allocation permission information storage unit 262 stores frequency channel allocation permission information. The frequency channel allocation permission information is information indicating a frequency channel allocated to the in-vehicle radio device 111 for radio communication.

The frequency channel allocation confirmation unit 261 is connected to the radio data generation unit 240, the radio signal modulation unit 270, the allocation permission information storage unit 262, and the request signal generation unit 263. The frequency channel allocation confirmation unit 261 confirms whether the frequency channel for radio communication is allocated to the in-vehicle radio device 111 based on the frequency channel allocation permission information. More specifically, when receiving the radio data packet from the radio data generation unit 240, the frequency channel allocation confirmation unit 261 reads out the frequency channel allocation permission information from the allocation permission information storage unit 262. The frequency channel allocation confirmation unit 261 compares the read frequency channel allocation permission information with the frequency channel included in the radio unit header of the radio data packet. By performing this comparison processing, the frequency channel allocation confirmation unit 261 confirms whether the frequency channel for radio communication is allocated to the in-vehicle radio device 111.

When confirming that the frequency channel for radio communication is allocated to the in-vehicle radio device 111, the frequency channel allocation confirmation unit 261 outputs the radio data packet received from the radio data generation unit 240 to the radio signal modulation unit 270.

On the other hand, when confirming that the frequency channel for radio communication is not allocated to the in-vehicle radio device 111, the frequency channel allocation confirmation unit 261 outputs a control signal for instructing generation of the frequency channel request signal to the request signal generation unit 263.

When receiving the control signal from the frequency channel allocation confirmation unit 261, the request signal generation unit 263 generates a frequency channel request signal for requesting the in-vehicle radio device 111 to allocate a frequency channel for radio communication. The generated frequency channel request signal is output from the request signal generation unit 263 to the radio signal modulation unit 270.

The request signal generation unit 263 arranges the radio unit header at the head of the frequency channel request signal. The radio type of the radio unit header indicates information indicating that the data to be transmitted is data related to the frequency channel request. In addition, the frequency channel in the radio unit header shows a combination of the frequency channels for the frequency channel request.

The allocation information extraction unit 264 is connected to the radio signal demodulation unit 280, the frequency channel allocation confirmation unit 261, and the allocation permission information storage unit 262. The allocation information extraction unit receives the demodulated frequency channel allocation signal from the radio signal demodulation unit 280. At this time, the allocation information extraction unit 264 can recognize that the received signal is a frequency channel allocation signal by referring to the radio type of the radio unit header of the signal (data string) received from the radio signal demodulation unit 280.

Further, the allocation information extraction unit 264 extracts information of the frequency channel to be permitted from the frequency channel allocation signal. The allocation information extraction unit 264 notifies the frequency channel allocation confirmation unit 261 of the extracted information of the frequency channel. In addition, the allocation information extraction unit 264 registers the extracted information of the frequency channel as information of the frequency channel allocated to the in-vehicle radio device 111 in the frequency channel allocation information of the allocation permission information storage unit 262.

The frequency channel allocation confirmation unit 261 continues to output the control signal for instructing the generation of the frequency channel allocation request signal to the request signal generation unit 263 until the allocation information extraction unit 264 notifies the frequency channel allocation confirmation unit 261 of the frequency channel allocation permission information. In other words, while receiving the control signal, the request signal generation unit 263 repeatedly generates the frequency channel request signal at predetermined intervals.

Returning to FIG. 2, the description of the configuration of the in-vehicle radio device 111 will be continued. The radio signal modulation unit 270 is connected to the frequency channel allocation control unit 260. When receiving the radio data packet from the frequency channel allocation control unit 260, the radio signal modulation unit 270 performs modulation processing on the radio data packet received from the frequency channel allocation control unit 260 using the allocated frequency channel. The radio signal modulation unit 270 radiates the radio signal of the radio data packet generated by performing the modulation processing to the radio space via an antenna (not shown). In this manner, the radio unit 220 of the in-vehicle radio device 111 transmits the radio data packet to the roadside radio device 131 using the allocated frequency channel. The transmitted radio data packet includes the vehicle identification information given by the radio unit 220 and the communication type information given by the application unit 210.

In addition, when receiving the frequency channel request signal from the frequency channel allocation control unit 260, the radio signal modulation unit 270 performs modulation processing on the frequency channel request signal using the combination of the frequency channels for the frequency channel request. The radio signal modulation unit 270 radiates the radio signal of the frequency channel request signal generated by performing the modulation processing to the radio space via the antenna (not shown). In this manner, the radio unit 220 of the in-vehicle radio device 111 transmits the frequency channel request signal to the roadside radio device 131 using the combination of the frequency channels for the frequency channel request.

The radio signal demodulation unit 280 is connected to the radio data processing unit 250 and the frequency channel allocation control unit 260. The radio signal demodulation unit 280 receives a radio signal transmitted from the roadside radio device 131 via the antenna (not shown). The radio signal demodulation unit 280 performs demodulation processing, that is, frequency conversion processing and decoding processing on the received radio signal.

The radio signal demodulation unit 280 demodulates the radio data packet or the frequency channel allocation signal by performing the demodulation processing on the received radio signal. The demodulated radio data packet is output to the radio data processing unit 250. In addition, the demodulated frequency channel allocation signal is output to the frequency channel allocation control unit 260.

The radio data processing unit 250 is connected to the radio signal demodulation unit 280 and the SAM 230. The radio data processing unit 250 receives the demodulated radio data packet from the radio signal demodulation unit 280. At this time, the radio data processing unit 250 can recognize that the received signal is a radio data packet by referring to the radio type of the radio unit header of the signal (data string) received from the radio signal demodulation unit 280.

In addition, the radio data processing unit 250 performs demodulation processing on the radio data packet to demodulate the SAM data packet. Specifically, the radio data processing unit 250 performs processing of removing the radio unit header from the radio data packet and including a part of the information included in the removed radio unit header, for example, the information of the MAC address, in the application data. In this way, the SAM data packet on which the demodulation processing is performed is output from the radio data processing unit 250 to the SAM 230.

Figure 4:
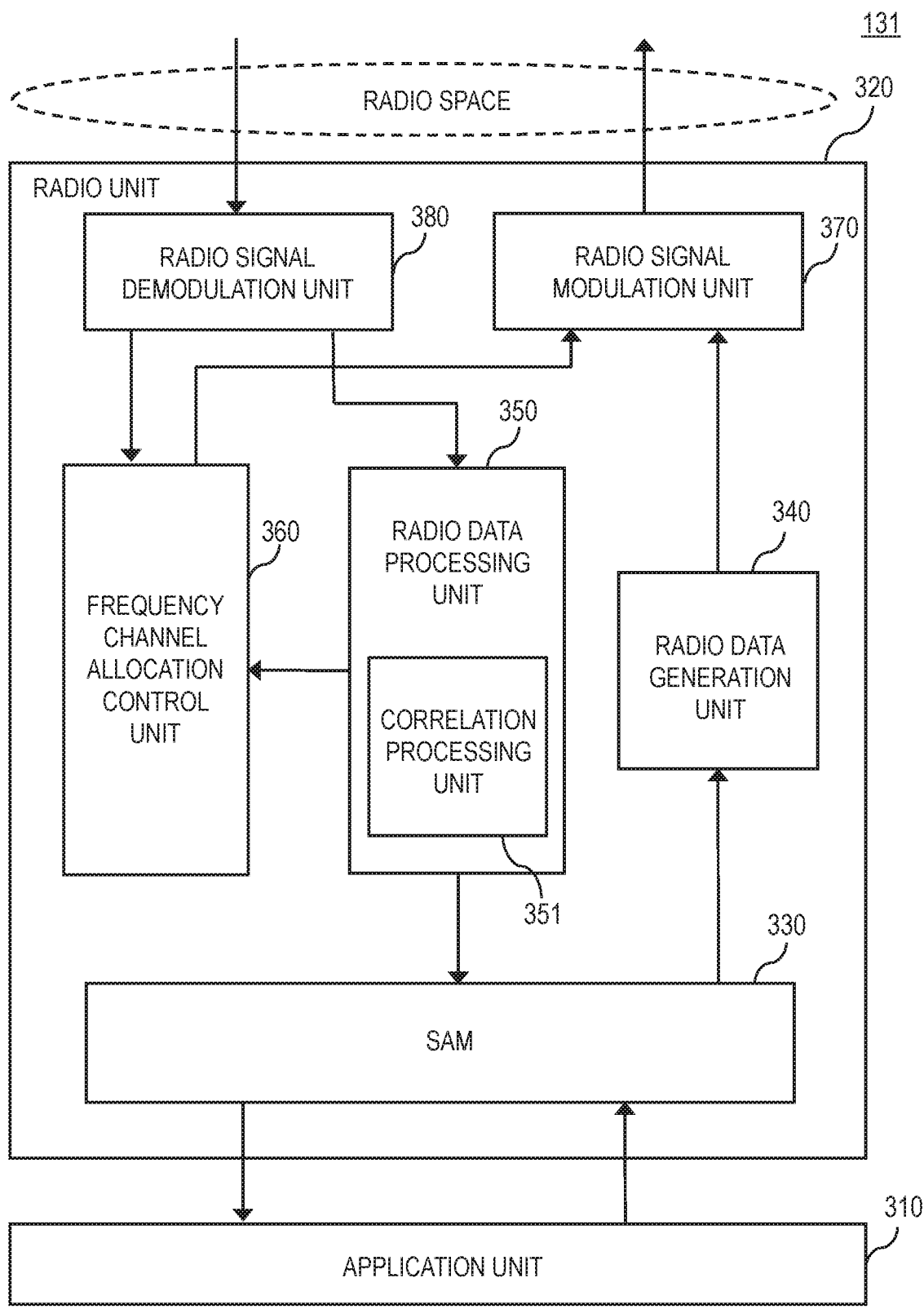
FIG. 4 is a block diagram showing an example of a configuration of a roadside radio device according to the first embodiment.

Next, the roadside radio device according to the first embodiment will be described. FIG. 4 is a block diagram showing an example of a configuration of the roadside radio device 131 according to the first embodiment. The roadside radio device 131 performs the radio communication with the in-vehicle radio devices 111 and 121, but only the radio communication between the roadside radio device 131 and the in-vehicle radio device 111 is illustrated here. As shown in FIG. 4, the roadside radio device 131 includes an application unit (first application unit) 310 and a radio unit (first radio unit) 320. The application unit 310 and the radio unit 320 are connected to each other.

The radio unit 320 includes a SAM 330, a radio data generation unit 340, a radio data processing unit 350, a frequency channel allocation control unit (first frequency channel allocation control unit) 360, a radio signal modulation unit 370, and a radio signal demodulation unit 380.

The radio signal demodulation unit 380 is connected to the radio data processing unit 350 and the frequency channel allocation control unit 360. The radio signal demodulation unit 380 receives a radio signal transmitted from the in-vehicle radio device 111 via an antenna (not shown). The radio signal demodulation unit. 380 performs demodulation processing, that is, frequency conversion processing and decoding processing on the received radio signal.

The radio signal demodulation unit 380 performs the demodulation processing on the received radio signal to demodulate the radio data packet or the frequency channel request signal. The demodulated radio data packet is output to the radio data processing unit 350. In addition, the demodulated frequency channel request signal is output to the frequency channel allocation control unit 360. In this manner, the radio unit 320 of the roadside radio device 131 receives the radio data packet and the frequency channel request signal transmitted from the in-vehicle radio device 111.

The radio data processing unit 350 is connected to the radio signal demodulation unit 380, the frequency channel allocation control unit 360, and the SAM 330. The radio data processing unit 350 receives the demodulated radio data packet from the radio signal demodulation unit 380.

In addition, the radio data processing unit 350 includes a correlation processing unit 351. The correlation processing unit 351 performs a correlation determination as to whether there is a correlation between data strings of predetermined locations of the received radio data packet. Specifically, the correlation processing unit 351 compares the vehicle identification information and the communication type information included in the received radio data packet to determine whether there is a correlation in the radio data packet.

As described above, common vehicle class information is used in the vehicle identification information and the communication type information. Therefore, if the application generating the application data packet executed by the application unit of the in-vehicle radio device is not tampered with, that is, if the radio data packet is not transmitted from the spoofing radio device, the vehicle identification information and the communication type information included in the radio data packet should match. By performing the correlation determination for the radio data packet, the roadside radio device 131 can determine whether the in-vehicle radio device that is the transmission source of the radio data packet is a spoofing radio device.

When the correlation processing unit 351 determines that there is the correlation in the radio data packet, the radio data processing unit 350 performs demodulation processing on the radio unit header included in the radio data packet to demodulate the SAM data packet. Specifically, the radio data processing unit 350 performs processing of removing the radio unit header from the radio data packet and including a part of the information included in the removed radio unit header, for example, the information of the MAC address, in the application data. The radio data processing unit 350 outputs the SAM data packet demodulated in this manner to the SAM 330.

On the other hand, when the correlation processing unit 351 determines that there is no correlation in the radio data packet, the radio data processing unit 350 generates, as information of the spoofing radio device, information for identifying the radio device which is the transmission source of the radio data packet (spoofing information), for example, information of the MAC address included in the radio unit header. The generated information of the spoofing radio device is output to the frequency channel allocation control unit 360. In addition, the radio data processing unit 350 treats the received radio data packet as invalid data. For example, the radio data processing unit 350 does not output the radio data packet to the SAM 330 or discards the radio data packet.

The frequency channel allocation control unit 360 is connected to the radio signal demodulation unit 380 and the radio signal modulation unit 370. When receiving the demodulated frequency channel request signal from the radio signal demodulation unit 380, the frequency channel allocation control unit 360 determines whether it is possible to allocate the frequency channel for radio communication to the in-vehicle radio device 111 of the transmission source (request source) based on the information of the spoofing radio device. When determining that it is possible to allocate the frequency channel, the frequency channel allocation control unit 360 generates a frequency channel allocation signal including information of the frequency channel to be permitted. The frequency channel allocation. control unit 360 outputs the generated frequency channel allocation signal to the radio signal modulation unit 370.

Figure 5:
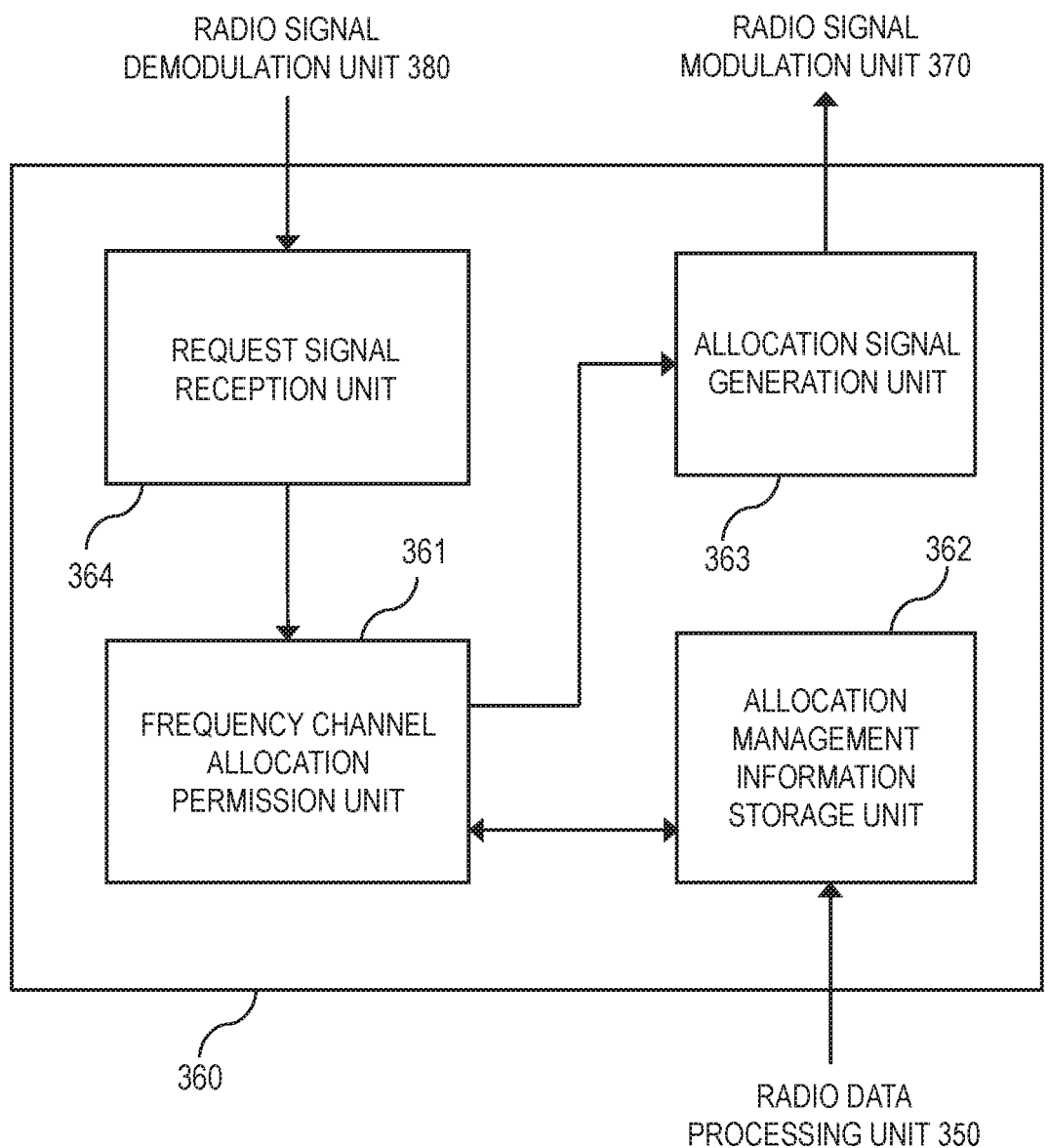
FIG. 5 is a block diagram showing an example of a configuration of a frequency channel allocation control unit according to the first. embodiment.

Referring now to FIG. 5, a configuration of the frequency channel allocation control unit 360 will be described in detail. FIG. 5 is a block diagram showing an example of the configuration of the frequency channel allocation control unit 360 according to the first embodiment. As shown in FIG. 5, the frequency channel allocation control unit 360 includes a frequency channel allocation permission unit 361, an allocation management information storage unit 362, an allocation signal generation unit 363, and a request signal reception unit 364.

The allocation management information storage unit 362 stores frequency channel allocation management information. The frequency channel allocation management information includes information of the frequency channels that can be allocated to the in-vehicle radio. In addition, the allocation management information storage unit 362 is connected to the radio data processing unit 350. The allocation management information storage unit 362 receives the information of the spoofing radio device (e.g., the MAC address of the spoofing radio device) from the radio data processing unit 350 and registers the information in the frequency channel allocation management information. That is, the frequency channel allocation management information includes the information of the frequency channel that can be allocated to the in-vehicle radio and the information of the spoofing radio device.

The request signal reception unit 364 is connected to the radio signal demodulation unit 380 and the frequency channel allocation permission unit 361. The request signal reception unit 364 receives the demodulated frequency channel request signal from the radio signal demodulation unit 380 by referring to the radio type of the radio unit header. The request signal reception unit 364 outputs the frequency channel request signal to the frequency channel allocation permission unit 361.

The frequency channel allocation permission unit 361 is connected to the request signal reception unit 364, the allocation management information storage unit 362 and the allocation signal generation unit 363. The frequency channel allocation permission unit 361 operates in response to the frequency channel request signal transmitted from the in-vehicle radio device 111 and determines whether to allocate the frequency channel for radio communication to the in-vehicle radio device 111 based on the frequency channel allocation management information. When determining to allocate the frequency channel to the in-vehicle radio device 111, the frequency channel allocation permission unit 361 determines the frequency channel to be permitted to the in-vehicle radio device 111.

Specifically, when receiving the frequency channel request signal transmitted from the in-vehicle radio device 111 from the request signal reception unit 364, the frequency channel allocation permission unit 361 reads out the frequency channel allocation management information from the allocation management information storage unit 362. The frequency channel allocation permission unit 361 confirms whether there is a frequency channel that can be allocated to the in-vehicle radio device based on the read frequency channel allocation management information.

Further, based on the read frequency channel allocation management information, the frequency channel allocation permission unit 361 confirms whether the in-vehicle radio device 111 that is the transmission source of the frequency channel request signal is registered as a spoofing radio device. Specifically, the frequency channel allocation permission unit 361 confirms whether the MAC address included in the radio unit header of the frequency channel request signal is registered in the frequency channel allocation management information as the MAC address of the spoofing radio device.

When determining that there is the frequency channel that can be allocated to the in-vehicle radio device and that the in-vehicle radio device 111 that is the transmission source of the frequency channel request signal is not the spoofing radio device, the frequency channel allocation permission unit 361 determines the frequency channel for radio communication to be permitted to the in-vehicle radio device 111. The frequency channel allocation permission unit 361 outputs the information of the frequency channel to be permitted to the allocation signal generation unit 363, and outputs a control signal for instructing generation of the frequency channel allocation signal.

Further, the frequency channel allocation permission unit 361 outputs the frequency channel to be permitted to the in-vehicle radio device 111 to the allocation management information storage unit 362. The allocation management information storage unit 362 includes the information of the frequency channel in the frequency channel allocation management information. In this way, the information of the frequency channel that can be allocated to the in-vehicle radio included in the frequency channel allocation management information is updated.

On the other hand, when determining that there is not the frequency channel that can be allocated to the in-vehicle radio device or that the in-vehicle radio device 111, which is the transmission source of the frequency channel request signal, is the spoofing radio device, the frequency channel allocation permission unit 361 treats the frequency channel request signal as an invalid signal. For example, the frequency channel allocation permission unit 361 does not process the frequency channel request signal or discards the frequency channel request signal. In this case, the frequency channel allocation permission unit 361 does not allocate the frequency channel for radio communication to the in-vehicle radio device 111 that is the transmission source of the frequency channel request signal.

The allocation signal generation unit 363 is connected to the frequency channel allocation permission unit 361 and the radio signal modulation unit 370. When receiving the information of the frequency channel to be permitted and the control signal for instructing the generation of the frequency channel allocation signal from the frequency channel allocation permission unit 361, the allocation signal generation unit 363 generates the frequency channel allocation signal including the information of the frequency channel to be permitted to the in-vehicle radio device 111. The generated frequency channel allocation signal is output from the allocation signal generation unit 363 to the radio signal modulation unit 370.

Incidentally, the allocation signal generation unit 363 arranges the radio unit header at the head of the frequency channel allocation signal. The radio type of the radio unit header indicates information indicating that the data to be transmitted is data related to the frequency channel request. In addition, the frequency channel in the radio unit header shows a combination of the frequency channels for the frequency channel request.

Returning to FIG. 4, the description of the configuration of the roadside radio device 131 will be continued. The radio signal modulation unit 370 is connected to the frequency channel allocation control unit 360 and the radio data generation unit 340. When receiving the radio data packet from the radio data generation unit 340, the radio signal modulation unit 370 performs modulation processing on the radio data packet received from the radio data generation unit 340 using a frequency channel dedicated to the roadside radio device 131. The radio signal modulation unit 370 radiates the radio signal of the radio data packet generated by performing the modulation processing to the radio space via the antenna (not shown). In this manner, the radio unit 320 of the roadside radio device 131 transmits the radio data packet to the in-vehicle radio device 111.

In addition, when receiving the frequency channel allocation signal from the frequency channel allocation control unit 360, the radio signal modulation unit 370 performs modulation processing on the frequency channel allocation signal using the frequency channel dedicated to the roadside radio device 131. The radio signal modulation unit 370 radiates the radio signal of the frequency channel allocation signal generated by performing the modulation processing to the radio space via the antenna (not shown). In this manner, the radio unit 320 of the roadside radio device 131 transmits the frequency channel allocation signal to the in-vehicle radio device 111 which is the transmission source of the frequency channel request signal.

The radio data generation unit 340 is connected to the SAM 330 and the radio signal modulation unit 370. The radio data generation unit 340 generates a radio data packet by appending a radio unit header to the SAM data packet received from the SAM 330. The radio data generation unit 340 outputs the radio data packet to the radio signal modulation unit 370.

The SAM 330 is connected to the radio data processing unit 350, the radio data generation unit 340, and the application unit 310. When performing reception processing, the SAM 330 receives demodulated SAM data packet from the radio data processing unit 350. The SAM 330 performs demodulation processing on the SAM data packet to demodulate the application data packet. Specifically, the SAM 330 performs processing of removing the SAM header and the application related information from the SAM data packet and including a part of the removed SAM header or application related information, for example, the vehicle identification information, in the application data. The SAM 330 outputs the application data packet demodulated in this manner to the application unit 310.

In addition, when performing transmission processing, the SAM 330 receives the application data packet from the application unit 310. The SAM 330 generates a SAM data packet by appending a SAM header and application related information the application data packet. The SAM 330 is connected to the radio data generation unit 340 and outputs the generated SAM data packet to the radio data generation unit 340.

When the roadside radio device 131 starts data transmission processing to the in-vehicle radio device 111, the application unit 310 generates an application data packet. An application data packet includes an application header, communication type information, and application data. The application unit 310 outputs the application data packet to the radio unit 320.

When the roadside radio device 131 receives data from the in-vehicle radio device 111, the application unit 310 receives the demodulated application data packet from the radio unit 320. The application unit 310 processes the application data included in the received application data packet.

Figure 6:
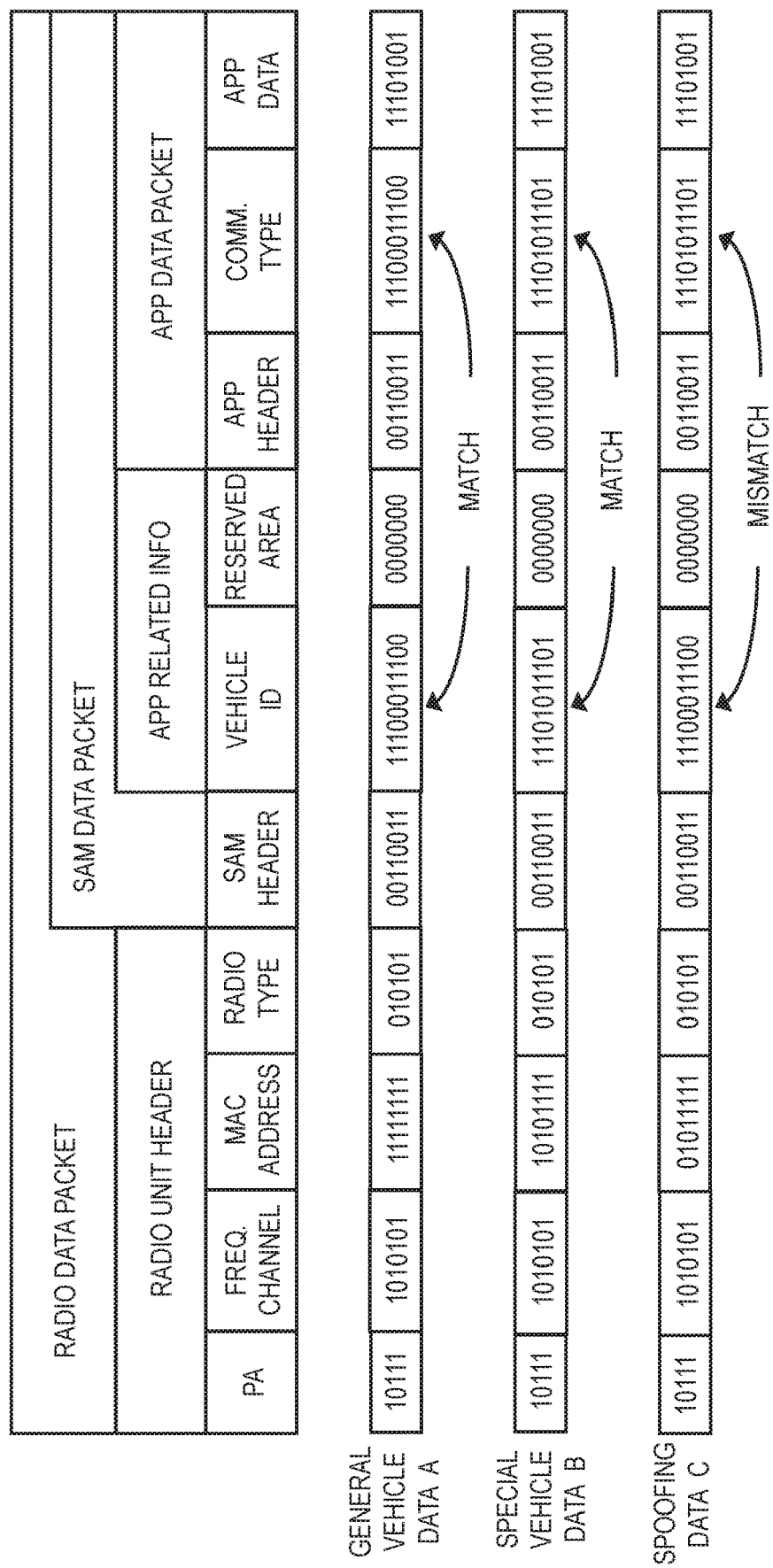
FIG. 6 is a structure diagram showing data structure of radio data packets transmitted from the in-vehicle radio devices.

Next, specific examples of radio data packets transmitted from the in-vehicle radio device will be described. FIG. 6 is a structure diagram showing data structure of radio data packets transmitted from the in-vehicle radio devices. FIG. 6 shows, in order from the top, data structure of a radio data packet, an example of data A (general vehicle data A) of a radio data packet in the case where a vehicle in which a radio device is mounted is a general vehicle, an example of data B (special vehicle data B) of a radio data packet in the case where a vehicle in which a radio device is mounted is a special vehicle, and an example of data C (spoofing data C) of a radio data packet in the case where an in-vehicle radio device is a spoofing radio device.

As shown in FIG. 6, "11100011100" is used as vehicle class information for the general vehicle. In addition, "11101011101" is used as vehicle class information for the special vehicle. These vehicle class information are commonly used in the vehicle identification information generated by the radio unit 220 and the communication type information generated by the application unit 210.

The general vehicle data A and the special vehicle data B are not data transmitted from the spoofing radio device, in other words, data transmitted from a normal radio device. That is, the vehicle identification information and the communication type information included in the general vehicle data A match. Further, the vehicle identification information and the communication type information included in the special vehicle data B match. Therefore, the correlation processing unit 351 determines that there is a correlation in each of the general vehicle data A and the special vehicle data B.

In contrast, the spoofing data C is data transmitted from the spoofing radio device, that is, data transmitted from an abnormal radio device. In the example shown in FIG. 6, the spoofing radio device of the spoofing data C is configured by a combination of the radio unit 220 for the general vehicle and the application unit 210 for the special vehicle. That is, the vehicle identification information "11101011101" and the communication type information "11100011100" do not match. As a result of the correlation determination, the correlation processing unit 351 determines that there is no correlation in the spoofing data C. In this way, the spoofing radio device is detected.

When the spoofing radio device (radio communication device) is detected, information in the radio unit header, for example, the information of the MAC address, is registered as the information of the spoofing radio device in the frequency channel allocation management information of the allocation management information storage unit 362. As shown in FIG. 6, information unique to each radio device is used for the MAC address. Therefore, if the MAC address used in the spoofing radio device is held as information of the spoofing radio device, the roadside radio device 131 can properly identify the spoofing radio device and the normal radio.

Although the above description exemplifies that the MAC address is used as information for identifying a spoofing radio device, the present disclosure is not limited thereto.

That is, the information may be other than the MAC address as long as the information can identify the radio device. For example, information held by each SAM included in the SAM header that is difficult to tamper with may be used as information identifying the radio device.

In addition, the data structure of the radio data packet shown in FIG. 6 does not display all the data. Needless to say, the radio data packet has other data areas such as information for packet management, information indicating the end of the packet, and information for error correction.

As described above, the radio unit of the roadside radio device according to the first embodiment includes the correlation processing unit that compares the data string the vehicle identification information given by the radio unit of the in-vehicle radio device with the data string of the communication type information given by the application unit of the in-vehicle radio device to determine whether there is the correlation in the radio data packet transmitted from the in-vehicle radio device.

When the correlation processing unit determines that there is the correlation in the radio data packet transmitted from the in-vehicle radio device, the radio unit of the roadside radio device outputs the application data included in the radio data packet transmitted from the in-vehicle radio device to the application unit of the roadside radio device. In this case, the roadside radio device determines that the in-vehicle radio device which is the transmission source of the radio data packet is not the spoofing radio device.

On the other hand, when the correlation processing unit determines that there is no correlation in the radio data packet transmitted from the in-vehicle radio device, the radio unit of the roadside radio device treats the radio data packet transmitted from the in-vehicle radio device as invalid data. For example, the radio unit of the roadside radio device does not use the radio data packet or discards the radio data packet. In this case, the roadside radio device determines that the vehicle radio device which is the transmission source of the radio data packet is the spoofing radio device.

As described above, even in the case where the in-vehicle radio device is the spoofing radio device due to tampering with the application executed by the application unit of the in-vehicle radio device, the roadside radio device can detect the spoofing radio device by determining whether there is the correlation in the radio data packet transmitted from the spoofing radio device. As a result, it is possible to prevent a problem that communication by the normal radio devices is inhibited due to communication by the spoofing radio device.

Since the roadside radio device detects the spoofing radio device by determining whether there is the correlation in the radio data packet transmitted from the spoofing radio device, the roadside radio device at least once allocates the frequency channel to the spoofing radio device. That is, when starting radio communication, the spoofing radio device transmits a frequency channel request signal to the roadside radio device. In contrast, the roadside radio device transmits a frequency channel allocation signal and allocates a frequency channel for the spoofing radio device. However, if the spoofing radio device subsequently transmits a radio data packet using the allocated frequency channel, the roadside radio device may determine that the source of the radio data packet is the spoofing radio device. The roadside radio device treats the radio data packet transmitted from the radio device determined to be the spoofing radio device as invalid data, and does not allocate a frequency channel again even if the roadside radio device receives a frequency channel request signal transmitted from the radio device determined to be the spoofing radio device. In this manner, the roadside radio device can exclude the spoofing radio device from the radio communication system.

Second Embodiment

Figure 7:
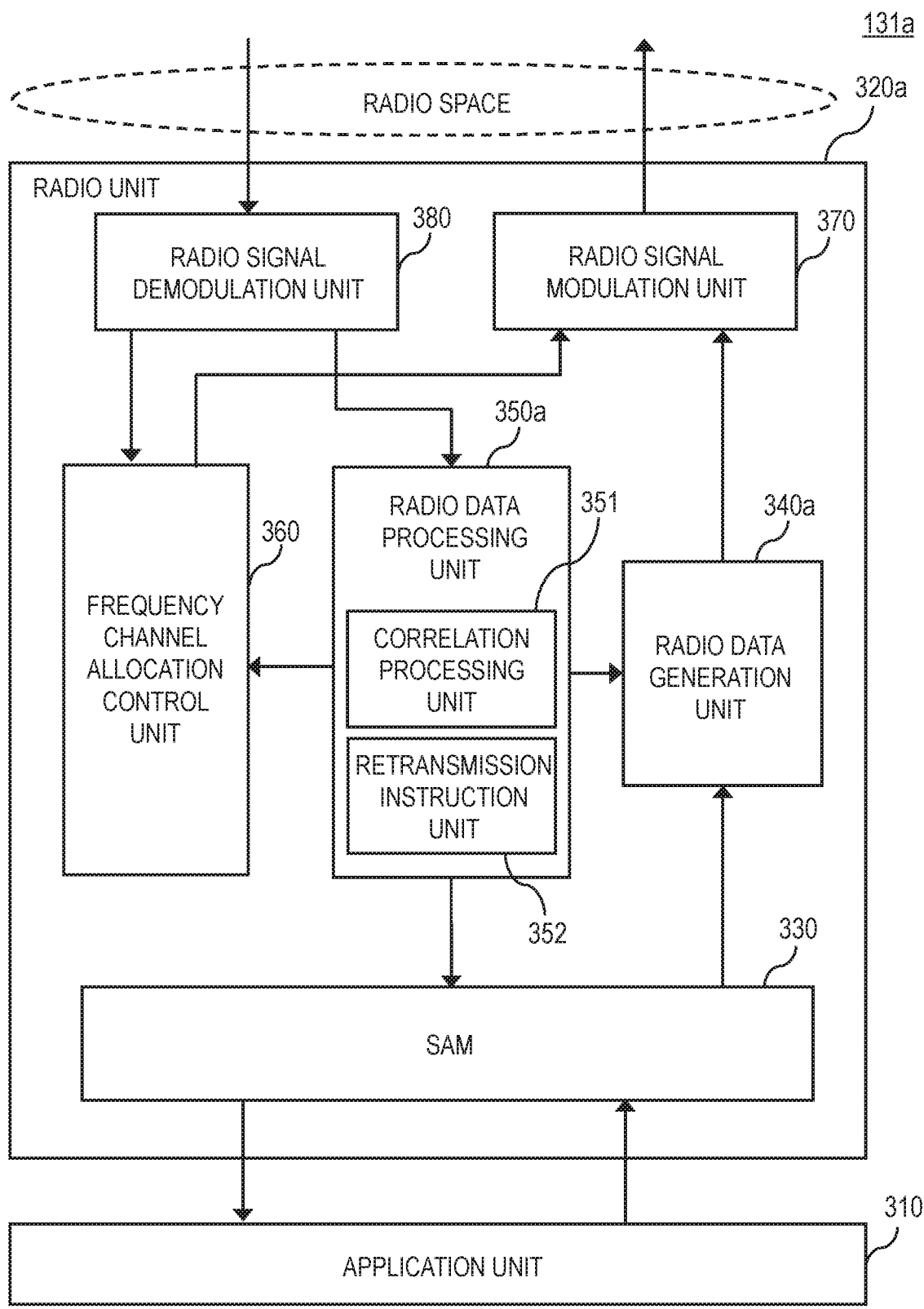
FIG. 7 is a block diagram showing an example of a configuration of a roadside radio device according to a second embodiment.

Next, a second embodiment will be described. A roadside radio device according to the second embodiment differs from the roadside radio device according to the first embodiment in that the roadside radio device according to the second embodiment includes a configuration that prevents a normal in-vehicle radio device from being erroneously determined as a spoofing radio device by performing correlative determination a plurality of times. FIG. 7 is a block diagram showing an example of a configuration of a roadside radio device 131*a* according to the second embodiment. The roadside radio device 131*a* corresponds to another embodiment of the roadside radio device 131.

As shown in FIG. 7, the radio unit 320, the radio data generation unit 340, and the radio data processing unit 350 of the roadside radio device 131 of FIG. 4 are changed to a radio unit 320*a*, a radio data generation unit 340*a*, and a radio data processing unit 350*a*, respectively. Further, the radio data processing unit 350*a* includes a retransmission instruction unit (first retransmission instruction unit) 352 in addition to the configuration of the radio data processing unit 350 shown in FIG. 4.

The retransmission instruction unit 352 measures the number of times that the correlation processing unit 351 determines that there is no correlation in a radio data packet. The retransmission instruction unit 352 generates a first retransmission instruction signal for instructing retransmission of the radio data packet in accordance with the measured number of times. The generated first retransmission instruction signal is output to the radio data generation unit 340*a*.

When receiving the first retransmission instruction signal, the radio data generation unit 340*a* generates a first retransmission request signal for requesting retransmission to the in-vehicle radio device which is the transmission source of the radio data packet. The first retransmission request signal is transmitted to the in-vehicle radio device which is the transmission source of the radio data packet via the radio signal modulation unit 370. The in-vehicle radio device that has received the first retransmission request signal performs retransmission processing on the radio data packet.

In addition, when the measured number of times by the retransmission instruction unit 352 reaches a predetermined value, the radio data processing unit 350*a* determines that the in-vehicle radio device that is the transmission source of the radio data packet a spoofing radio device and generates information of the spoofing radio device. At this timing, the allocation management information storage unit 362 registers the information of the spoofing radio device in the frequency channel allocation management information.

In radio communication, a data string cannot be accurately reproduced (demodulated) every time due to a communication error. In the first embodiment, since it is determined whether the in-vehicle radio device is a spoofing radio device by one correlative determination processing, it is determined that the in-vehicle radio device is a spoofing radio device, for example, even when a mismatch occurs in the data strings of the radio data packet due to generation of noises. That is, there is a possibility that a normal in-vehicle radio device that has not been tampered with is erroneously determined to be a spoofing radio device.

However, the roadside radio device according to the second embodiment includes the retransmission instruction unit that measures the number of times that it is determined that there is no correlation in the radio data packet and instructs retransmission of the radio data packet in accordance with the measured number of times. The radio unit of the roadside radio device transmits the first retransmission request signal for requesting retransmission of the radio data packet to the in-vehicle radio device based on the instruction from the retransmission instruction unit. Thus, the in-vehicle radio device can perform the retransmission processing on the radio data packet until the roadside radio device can correctly receive the radio data packet from the in-vehicle radio device. As a result, it is possible to prevent the roadside radio device from erroneously determining the normal in-vehicle radio device as the spoofing radio device.

Third Embodiment

Figure 8:
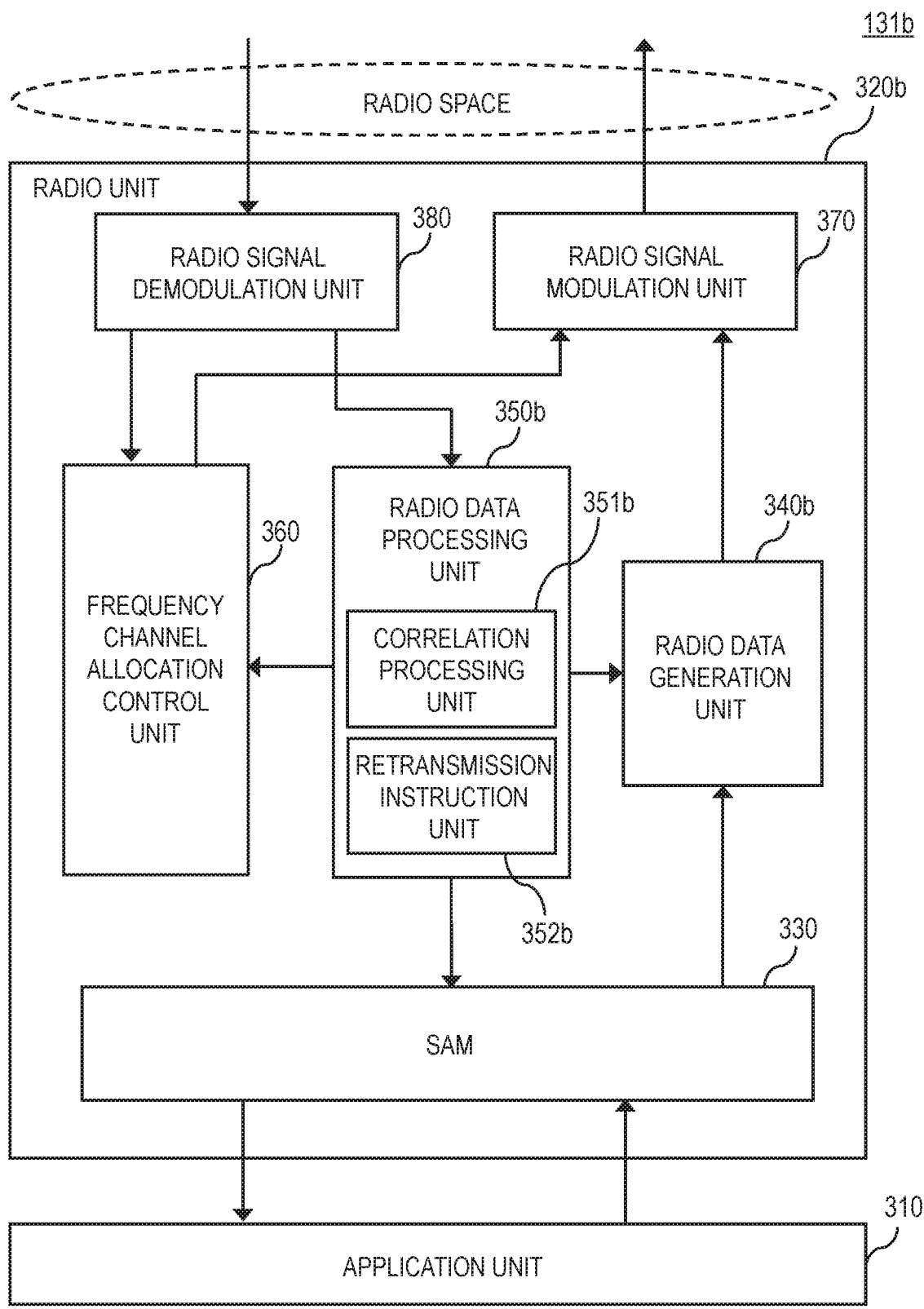
FIG. 8 is a block diagram showing an example of a configuration of a roadside radio device according to a third embodiment.

Next, a third embodiment will be described. The third embodiment is the same as the second embodiment in that a radio data packet is retransmitted, but at that time, it is different from the second embodiment in that a part of the radio data packet is changed. FIG. 8 is a block diagram showing an example of a configuration of a roadside radio device 131*b* according to the third embodiment. The roadside radio device 131*b* corresponds to another embodiment of the roadside radio device 131.

As shown in FIG. 8, the radio unit 320*a*, the radio data generation unit 340*a*, the radio data processing unit 350*a*, the correlation processing unit 351, and the retransmission instruction unit 352 of the roadside radio device 131*a* of FIG. 7 are changed to a radio unit 320*b*, a radio data generation unit 340*b*, a radio data processing unit 350*b*, a correlation processing unit 351*b*, and a retransmission instruction unit (second retransmission instruction unit) 352*b*, respectively.

The correlation processing unit 351*b* performs processing of comparing data strings at predetermined locations of the radio data packet and of confirming data string at a predetermined location of the radio data packet. Specifically, the correlation processing unit 351*b* performs processing of confirming the data string of the reserved area included in the radio data packet, in addition to processing of comparing the vehicle identification information and the communication type information included in the radio data packet. When confirming that the vehicle identification information and the communication type information match, or that the data string of the reserved area has been changed to a expected value, the correlation processing unit 351*b* determines that there is the correlation between in the radio data packet.

The retransmission instruction unit 352*b* measures the number of times that the correlation processing unit 351*b* determines that there is no correlation in the radio data packet. The retransmission instruction unit 352*b* generates a second retransmission instruction signal for instructing retransmission of the radio data packet and change of data of a part of the radio data packet in accordance with the measured number of times. The generated second retransmission instruction signal is output to the radio data generation unit 340*b*.

When receiving the second retransmission instruction signal, the radio data generation unit 340*b* generates a second retransmission request signal for requesting retransmission and change of a part of data to the in-vehicle radio device which is the transmission source of the radio data packet. The second retransmission request signal is transmitted to the in-vehicle radio device which is the transmission source of the radio data packet via the radio signal modulator 370.

In addition, when the measured number of times by the retransmission instruction unit 352*b* reaches a predetermined value, the radio data processing unit 350*b* determines that the in-vehicle radio device which is the transmission source of the radio data packet is the spoofing radio device and generates information of the spoofing radio device. At this timing, the allocation management information storage unit 362 registers the information of the spoofing radio device in the frequency channel allocation management information.

Figure 9:
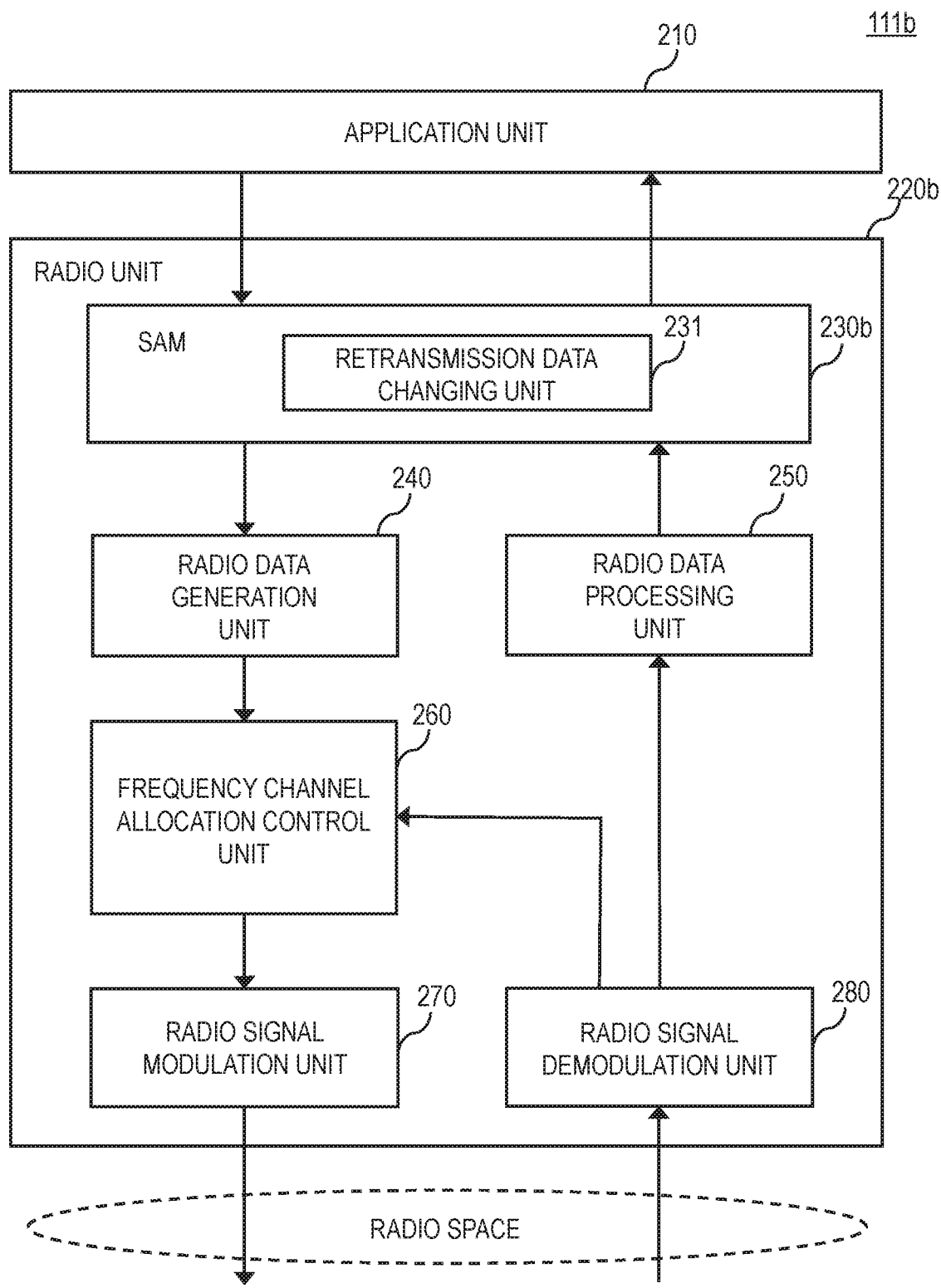
FIG. 9 is a block diagram showing an example of a configuration of an in-vehicle radio device according to the third embodiment.

FIG. 9 is a block diagram showing an example of a configuration of an in-vehicle radio device 111*b* according to the third embodiment. The in-vehicle radio device 111*b* corresponds to another embodiment of the in-vehicle radio devices 111 and 121. As shown in FIG. 9, the radio unit 220 and the SAM 230 of the in-vehicle radio device 111 of FIG. 2 are changed to a radio unit 220*b* and a SAM 230*b*, respectively. In addition, the SAM 230*b* includes a retransmission data changing unit 231.

When receiving the second retransmission request signal from the roadside radio device 131*b*, the in-vehicle radio device 111*b* performs retransmission processing on the radio data packet. In the retransmission processing, the SAM 230*b* receives an application data packet related to the retransmission from the application unit 210. The SAM 230*b* appends the SAM header and application related information to the application data packet related to the retransmission and generates a SAM data packet related to the retransmission.

At this time, the retransmission data changing unit 231 changes the data of the reserved area included in the application related information. The retransmission data changing unit 231 may change the data of the reserved area to a predetermined value. In addition, the retransmission data changing unit 231 may change the data of the reserved area to a value included in the second retransmission request signal (e.g., data of the reserved area included in the second retransmission request signal).

The SAM 230*b* outputs the SAM data packet related to the retransmission, that is, the SAM data packet in which a part of the data has been changed, to the radio data generation unit 240. In this manner, the in-vehicle radio device 111*b* retransmits the radio data packet in which a part of the data has been changed.

Figure 10:
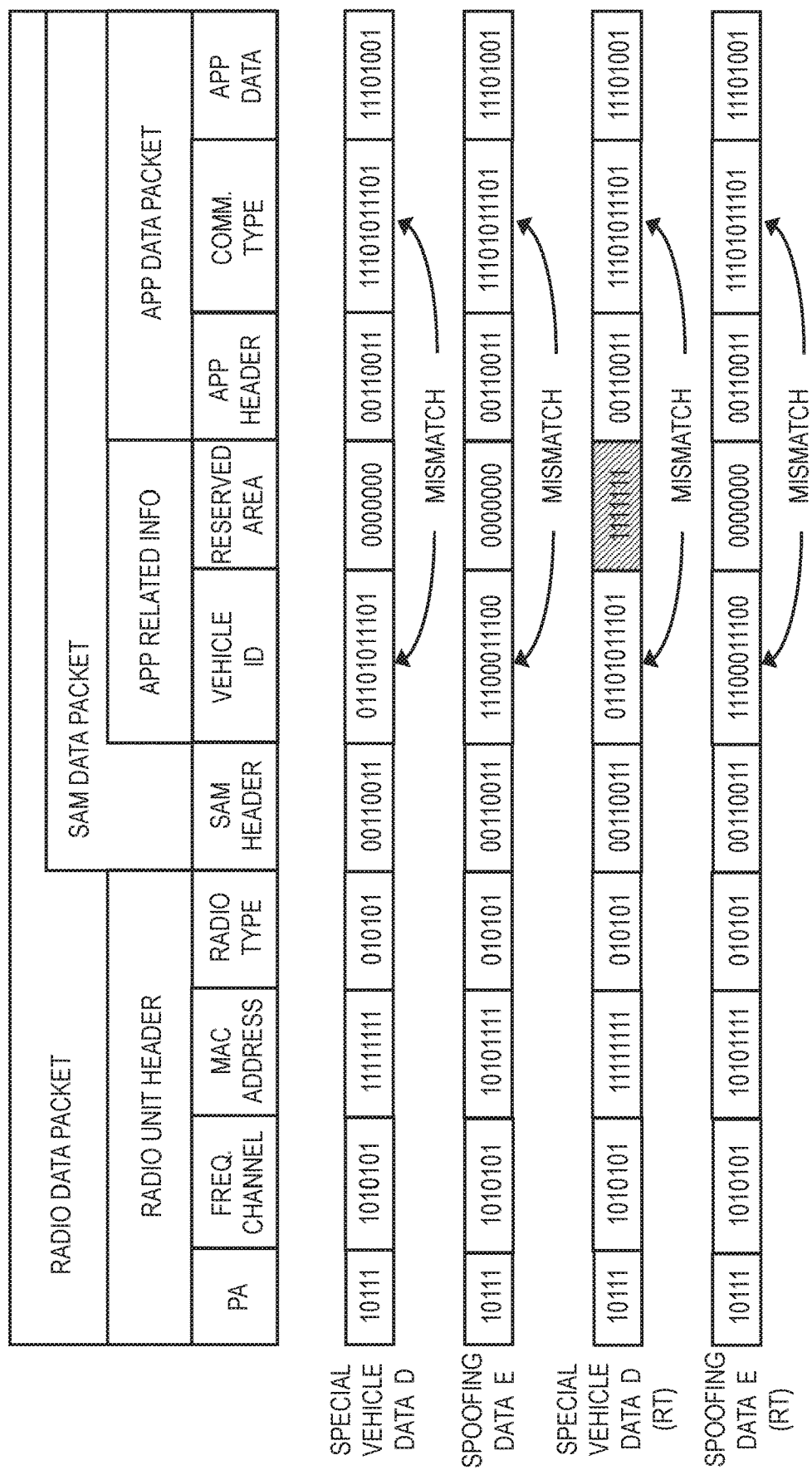
FIG. 10 is a structure diagram showing data structure of radio data packets transmitted from the in-vehicle radio devices.

Next, specific examples of radio data packets transmitted from the in-vehicle radio device 111*b* will be described. FIG. 10 is a structure diagram showing data structure of radio data packets transmitted from the in-vehicle radio device 111*b*. FIG. 10 shows, in order from the top, data structure of a radio data packet, an example of data D (special vehicle data D) of a radio data packet in the case where the vehicle 110 in which the in-vehicle radio device 111*b* is mounted is a special vehicle, an example of data E (spoofing data E) of a radio data packet the case where the in-vehicle radio device 111*b* is a spoofing radio device, an example of special vehicle data D (retransmission (RT)), and an example of spoofing data E (retransmission (RT)).

In FIG. 10, "11100011100" is used as vehicle class information for the general vehicle. In addition, "11101011101" is used as vehicle class information for the special vehicle.

Since the special vehicle data D is data transmitted from a normal in-vehicle radio device, "11101011101" is commonly used in the vehicle identification information and the communication type information. However, as shown in FIG. 10, the head of the vehicle identification information of the special vehicle data D is "0" due to a communication error although it should be "1" originally. That is, the vehicle identification information and the communication type information included in the special vehicle data D do not match. Therefore, the correlation processing unit 351*b* of the roadside radio device 131*b* determines that there is no correlation in the special vehicle data D.

On the other hand, the spoofing data E is data transmitted from the spoofing radio device. The spoofing radio device is configured by a combination of the radio unit 220*b* for the general vehicle and a spoofing application of the application unit 210 for the special vehicle. That the vehicle identification information and the communication type information included in the spoofing data E do not match. Therefore, the correlation processing unit 351*b* of the roadside radio device 131*b* determines that there is no correlation in the spoofing data E.

In addition, the special vehicle data D and the spoofing data E are not radio data packets related to retransmission. At this time, the data of the reserved area included in the special vehicle data D and the data of the reserved area included in the spoofing data E are "0000000" (zero padding).

Since it is not detected that there is the correlation in the radio data packet in the first transmission processing, the roadside radio device 131*b* transmits the second retransmission request signal. At this time, it is assumed that the second retransmission request signal includes an instruction to change the data of the reserved area to "1111111" (invert the zero padded bits and change all of them to "1"). In response to the second retransmission request signal, transmission processing of the special vehicle data D (retransmission) and the spoofing data E (retransmission) is performed.

The vehicle identification information of the special vehicle data D (retransmission) is "0" due to a communication error again. However, the data of the reserved area included in the special vehicle data D (retransmission) is changed from "0000000" to "1111111" in accordance with the change instruction included in the second retransmission request signal. At this time, the correlation processing unit 351*b* confirms that the vehicle identification information and the communication type information do not match, but that the data string of the reserved area has been changed to the expected value ("1111111"). As a result, the correlation processing unit 351*b* determines that there is the correlation in the retransmitted radio data packet.

On the other hand, in the spoofing data E (retransmission), the vehicle identification information and the communication type information do not match again. Further, since the spoofing radio device cannot properly perform the processing of changing the data in response to the second retransmission request signal, the data of the reserved area included in the spoofing data E (retransmission) remains "0000000". At this time, the correlation processing unit 351*b* confirms that the vehicle identification information and the communication type information do not match and that the data string of the reserved area has not been changed to the expected value ("1111111"). As a result, the correlation processing unit 351*b* determines that there is no correlation in the retransmitted radio data packet.

As described above, the roadside radio device according to the third embodiment includes the retransmission instruction unit that measures the number of times that it is determined that there is no correlation in the radio data packet and instructs retransmission of the radio data packet and change of the data of a part of the radio data packet in accordance with the measured number of times. The radio unit of the roadside radio device transmits the second retransmission request signal for requesting retransmission of the radio data packet and change of the data of a part of the radio data packet to the in-vehicle radio device based on the instruction from the retransmission instruction unit. The roadside radio device determines whether there is the correlation in the radio data packet by confirming whether a part of the radio data packet retransmitted from the in-vehicle radio device is changed to an expected value. As a result, even if a communication error occurs again, the roadside radio device can appropriately determine whether the in-vehicle radio device which is the transmission source of the radio data packet is the spoofing radio device.

The above-described third embodiment shows the example of changing the data of the reserved area included in the radio data packet at the time of retransmission, but the data to be changed is not limited to this. For example, the data to be changed may be predetermined data included in the SAM header.

Further, the above-described third embodiment shows the example of changing a part of the radio data packet at the time of retransmission, but the target to be changed is not limited to data. That is, the modulation method of the radio data packet or the frequency channel may be changed. In this case, the roadside radio device may determine whether the in-vehicle radio device which is the transmission source is spoofing radio device by confirming whether the modulation method or the frequency channel has changed at the time of retransmission.

In the first to third embodiments, the configurations and the functions of the in-vehicle radio device and the roadside radio device have been described with respect to the drawings. The functions of the blocks in the drawings may be configured by hardware (H/W), software (S/W), or a combination of H/W and S/W.

Figure 11:
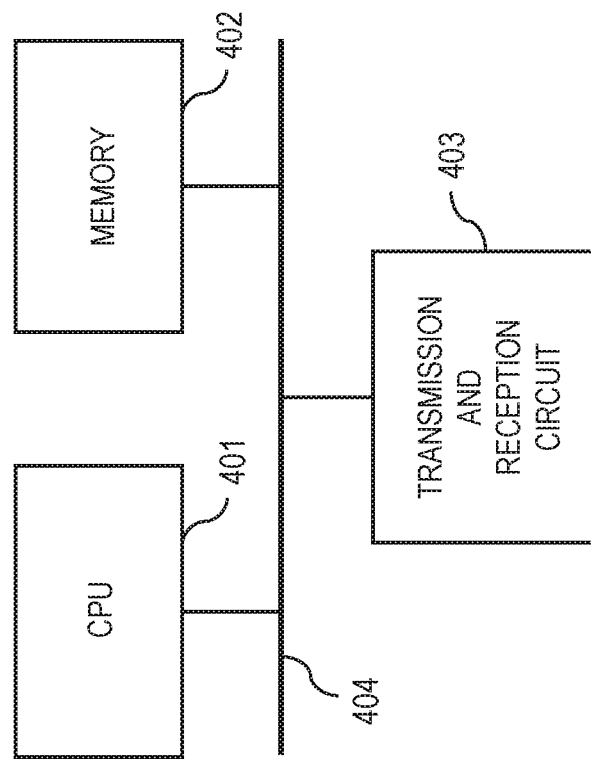
FIG. 11 is a block diagram showing an example of a hardware configuration of the in-vehicle radio device and the roadside radio device.

FIG. 11 is a block diagram showing an example of the H/W configuration of the in-vehicle radio device and the roadside radio device. As shown in FIG. 11, a Central Processing Unit (CPU) 401, a memory 402, and a transmission and reception circuit 403 are connected to each other via a bus 404. For example, the radio signal modulation unit and the radio signal demodulation unit according to the first to third embodiments may be configured by the transmission and reception circuit 403. Further, for example, the application unit, the SAM, the radio data generation unit, the radio data processing unit, and the frequency channel allocation control unit according to the first to third embodiments may be realized by the CPU 401 reading a predetermined program stored in the memory 402 and executing the read program. That is, the application unit, the SAM, the radio data generation unit, the radio data processing unit, and the frequency channel allocation control unit may be configured by a combination of H/W and S/W.

The in-vehicle radio devices according to the first to third embodiments are not limited to an aspect in which the radio communication device is incorporated in the vehicle body as a part of a component. For example, an aspect in which a mobile terminal, such as a smartphone is brought into a vehicle may also be included.

Although the invention made by the present inventors has been specifically described based on the embodiments, it is needless to say that the present invention is not limited to the above-described embodiments, and various changes may be made without departing from the scope thereof.

What is claimed is:

1. A roadside radio device comprising:
a first Central Processing Unit (CPU); and
a first memory storing a first program that, when executed by the first CPU, causes the first CPU to function as:
a first radio unit configured to receive a radio data packet or a frequency channel request signal from an in-vehicle radio device; and
a first application unit configured to process application data included in the radio data packet,
wherein the radio data packet includes i) vehicle identification information given by a second radio unit of the in-vehicle radio device and ii) communication type information given by a second application unit of the in-vehicle radio device, and is transmitted using an allocated frequency channel,
wherein the vehicle identification information comprises information indicating a vehicle in which the in-vehicle radio device is mounted,
wherein the communication type information comprises information indicating a vehicle to which the application data relates,
wherein the vehicle identification information and the communication type information are indicated using vehicle class information identifying a type of vehicles,
wherein the frequency channel request signal requesting allocation of a frequency channel for radio communication between the roadside device and the in-vehicle radio device comprises information given by the second radio unit,
wherein the first radio unit compares a data string of the vehicle identification information with a data string of the communication type information to determine whether there is a correlation in the radio data packet, when the first radio unit receives the radio data packet,
wherein, when the first radio unit determines that there is the correlation in the radio data packet, the first radio unit is configured to output the application data included in the radio data packet to the first application unit,
wherein, when the first radio unit determines that there is no correlation in the radio data packet, the first radio unit is configured to treat the radio data packet as invalid data,
wherein the first radio unit further has a spoofing information identifying the in-vehicle radio device as information on a spoofing radio device, and
wherein, when the first radio unit receives the frequency channel request signal, the first radio unit determines whether to allocate the frequency channel to the in-vehicle radio device based on the spoofing information.

2. The roadside radio device according to claim 1,
wherein, when the first radio unit determines that there is no correlation in the radio data packet, the first radio unit is configured to generate spoofing information identifying the in-vehicle radio device as information on a spoofing radio device to register into the first radio unit.

3. The roadside radio device according to claim 2,
wherein the first radio unit comprises:
a first storage configured to store frequency channel allocation management information and ii) register the information on the spoofing radio device in the frequency channel allocation management information, and wherein the first radio unit is configured to:
determine whether to allocate the frequency channel to the in-vehicle radio device based on the frequency channel allocation management information; and
determine the frequency channel to be permitted to the in-vehicle radio device when determining to allocate the frequency channel to the in-vehicle radio device.

4. The roadside radio device according to claim 3, wherein the first radio unit is configured to generate a frequency channel allocation signal including information on the frequency channel to be permitted to the in-vehicle radio information, and transmit the frequency channel allocation signal to the in-vehicle radio device.

5. The roadside radio device according to claim 2, wherein information for specifying the in-vehicle radio device comprises a Media Access Control (MAC) address included in the application data.

6. The roadside radio device according to claim 2,
wherein the first radio unit is configured to measure a number of times that the first radio unit determines that there is no correlation in the radio data packet, and
wherein the first radio unit is configured to transmit a first retransmission request signal for requesting the retransmission of the radio data packet to the in-vehicle radio device in accordance with the measured number of times.

7. The roadside radio device according to claim 6, wherein, when the measured number of times reaches a predetermined value, the first radio unit is configured to generate the spoofing information.

8. The roadside radio device according to claim 2,
wherein the first radio unit is configured to measure a number of times that the first radio unit determines that there is no correlation in the radio data packet, and
wherein the first radio unit is configured to transmit a retransmission request signal for requesting a retransmission of the radio data packet and a change of data of a part of the radio data packet to the in-vehicle radio device in accordance with the measured number of times.

9. The roadside radio device according to claim 8, wherein, when confirming that the data of the part of the radio data packet has been changed to an expected value, the first radio unit is configured to determine that there is the correlation in the radio data packet.

10. The roadside radio device according to claim 9, wherein, when the measured number of times reaches a predetermined value, the first radio unit is configured to generate the spoofing information.

11. A radio communication system comprising:
the roadside radio device according to claim 4; and
the in-vehicle radio device configured to perform radio communication with the roadside radio device,
wherein the in-vehicle radio device comprises:
a second CPU; and
a second memory storing a second program that, when executed by the second CPU, causes the second CPU to function as:
the second application unit configured to generate an application data packet including the communication type information and the application data; and
the second radio unit configured to generate the radio data packet including the vehicle identification information and the application data packet to transmit the radio data packet to the roadside radio device.

12. The radio communication system according to claim 11,
  wherein the second radio unit is configured to confirm whether the frequency channel for the radio communication is allocated to the in-vehicle radio device, and
  wherein, when the second radio unit confirms that the frequency channel for the radio communication is allocated to the in-vehicle radio device, the second radio unit is configured to transmit the radio data packet to the roadside radio device using a allocated frequency channel.

13. The radio communication system according to claim 12,
  wherein, when confirming that the frequency channel for the radio communication is not allocated to the in-vehicle radio device, the second radio unit is configured to generate the frequency channel request signal, and
  wherein the second radio unit is configured to transmit the frequency channel request signal to the roadside radio device using a combination of frequency channels for a frequency channel request.

14. The radio communication system according to claim 13, wherein the second radio unit comprises:
  a second storage configured to store a frequency channel allocation permission information indicating the frequency channel allocated to the in-vehicle radio device; and
  wherein the second radio unit is configured to confirm whether the frequency channel is allocated to the in-vehicle radio device based on the frequency channel allocation permission information.

15. The radio communication system according to claim 14, wherein the second radio unit is configured to:
  extract the information on the frequency channel to be permitted from the frequency channel allocation signal transmitted from the roadside radio device; and
  register, as information on the frequency channel allocated to the in-vehicle radio device, an extracted information on the frequency channel in the frequency channel allocation permission information.

16. The radio communication system according to claim 15,
  wherein the first radio unit is configured to measure a number of times that the first radio unit determines that there is no correlation in the radio data packet,
  wherein the first radio unit is configured to transmit a first retransmission request signal for requesting the retransmission of the radio data packet to the in-vehicle radio device in accordance with the measured number of times, and
  wherein the in-vehicle radio device is configured to receive the first retransmission request signal, and to perform retransmission processing of the radio data packet.

17. The radio communication system according to claim 16, wherein, when the measured number of times reaches a predetermined value, the first radio unit is configured to generate the spoofing information.

18. The roadside radio device according to claim 15,
  wherein the first radio unit is configured to measure a number of times that the first radio unit determines that there is no correlation in the radio data packet,
  wherein the first radio unit is configured to transmit a retransmission request signal for requesting a retransmission of the radio data packet and a change of data of a part of the radio data packet to the in-vehicle radio device in accordance with the measured number of times, and
  wherein the in-vehicle radio device is configured to receive the retransmission request signal, to change the part of the radio data packet, and to perform retransmission processing of the radio data packet whose part is changed.

19. The radio communication system according to claim 18, wherein, when confirming that the data of the part of the radio data packet has been changed to an expected value, the first radio unit is configured to determine that there is the correlation in the radio data packet.

20. The radio communication system according to claim 19, wherein, when the measured number of times reaches a predetermined value, the first radio unit is configured to generate the spoofing information.

* * * * *